United States Patent
Hiribarren et al.

(10) Patent No.: US 8,233,484 B2
(45) Date of Patent: Jul. 31, 2012

(54) NETWORK ADDRESS TRANSLATION (NAT) TRAVERSAL EQUIPMENT FOR SIGNAL MESSAGES CONFORMING TO THE SIP PROTOCOL BY REDUNDANCY OF ADDRESS INFORMATION

(75) Inventors: Vincent Hiribarren, Linas (FR); Thomas Levy, Paris (FR)

(73) Assignee: Alcatel Lucent, Paris (FR)

( * ) Notice: Subject to any disclaimer, the term of this patent is extended or adjusted under 35 U.S.C. 154(b) by 312 days.

(21) Appl. No.: 11/875,827

(22) Filed: Oct. 19, 2007

(65) Prior Publication Data

US 2008/0101389 A1 May 1, 2008

(30) Foreign Application Priority Data

Oct. 26, 2006 (FR) ...................... 06 54544

(51) Int. Cl.
*H04L 12/28* (2006.01)
*H04L 12/56* (2006.01)
(52) U.S. Cl. ............. 370/395.2; 370/392; 370/393; 370/395.21; 370/401; 709/203; 709/227; 709/228
(58) Field of Classification Search .............. 709/203, 709/227, 228
See application file for complete search history.

(56) References Cited

U.S. PATENT DOCUMENTS

| | | | | |
|---|---|---|---|---|
| 6,006,253 A * | 12/1999 | Kumar et al. | ................ | 709/204 |
| 6,981,278 B1 * | 12/2005 | Minnig et al. | ................ | 726/12 |
| 7,302,496 B1 * | 11/2007 | Metzger | ................ | 709/245 |
| 7,606,191 B1 * | 10/2009 | Breau et al. | ................ | 370/328 |
| 8,019,889 B1 * | 9/2011 | Biswas et al. | ................ | 709/245 |
| 2005/0033985 A1 * | 2/2005 | Xu et al. | ................ | 713/201 |
| 2005/0100001 A1 * | 5/2005 | Liu | ................ | 370/392 |
| 2006/0072569 A1 * | 4/2006 | Eppinger et al. | ................ | 370/389 |
| 2006/0215684 A1 * | 9/2006 | Capone | ................ | 370/437 |
| 2007/0019619 A1 * | 1/2007 | Foster et al. | ................ | 370/352 |
| 2007/0038723 A1 * | 2/2007 | Gourraud | ................ | 709/218 |
| 2007/0147378 A1 * | 6/2007 | Elgebaly et al. | ................ | 370/392 |
| 2007/0186281 A1 * | 8/2007 | McAlister | ................ | 726/14 |
| 2008/0013524 A1 * | 1/2008 | Hwang et al. | ................ | 370/352 |
| 2008/0270618 A1 * | 10/2008 | Rosenberg | ................ | 709/228 |
| 2009/0094692 A1 * | 4/2009 | Ono et al. | ................ | 726/11 |

OTHER PUBLICATIONS

Handley et al., RFC 2327 SDP: Session Description Protocol, Apr. 1998, The Internet Society.*
Rosenberg et al. Traversal Using Relay Nat (TURN). Sep. 9, 2005. Cisco Systems.*

(Continued)

*Primary Examiner* — Ayaz Sheikh
*Assistant Examiner* — Peter Chau
(74) *Attorney, Agent, or Firm* — Harness, Dickey & Pierce, P.L.C.

(57) ABSTRACT

Method of setting up a communication session (fm) between a calling communication client ($C_1$) and a called communication client ($C_2$), through a communication network ($SN_1$, SN, $SN_2$) comprising at least one address translation equipment ($NAT_1$, $NAT_2$). It comprises steps for transmission of signal messages (fs), transiting through address translation equipment and enabling interchange of physical addresses of communication clients to set up the communication session. This method is characterized in that at least one client transmits at least one signal message containing a physical address in a first location, and coded information containing this particular physical address in a distinct second location.

11 Claims, 1 Drawing Sheet

OTHER PUBLICATIONS

Rosenberg Cisco Systems J: "Interactive Connectivity Establishment (ICE): A Methodology for Network Address Translator (NAT) Traversal for Offer/Answer Protocols" IETF Standard-working-Draft, Internet Engineering Task Force, IETF, CH, vol. mmusic, No. 9, Jun. 26, 2006, XP015044857.

Rosenberg Cisco Systems C Huitema Microsoft R Mahy Plantronics D Wing Cisco Systems J: "Simple Traversal of UDP Through Network Address Translators (NAT) (STUN)" IETF Standard-Working-Draft, Internet Engineering Task Force, IETF, CH, vol. behave, No. 3, Feb. 2006, XP015043580.

BIGGS 3COM B: "A SIP Application Level Gateway for Network Address Translation" IETF Standard-Working-Draft, Internet Engineering Task Force, IETF, CH, Mar. 2000, XP015010887.

Huitema Microsoft C: "Teredo: Tunneling IPv6 over UDP through NATs" IETF Standard-Working-Draft, IETF, CH, vol. ngtrans, No. 8, Sep. 17, 2002, XP015002876.

* cited by examiner

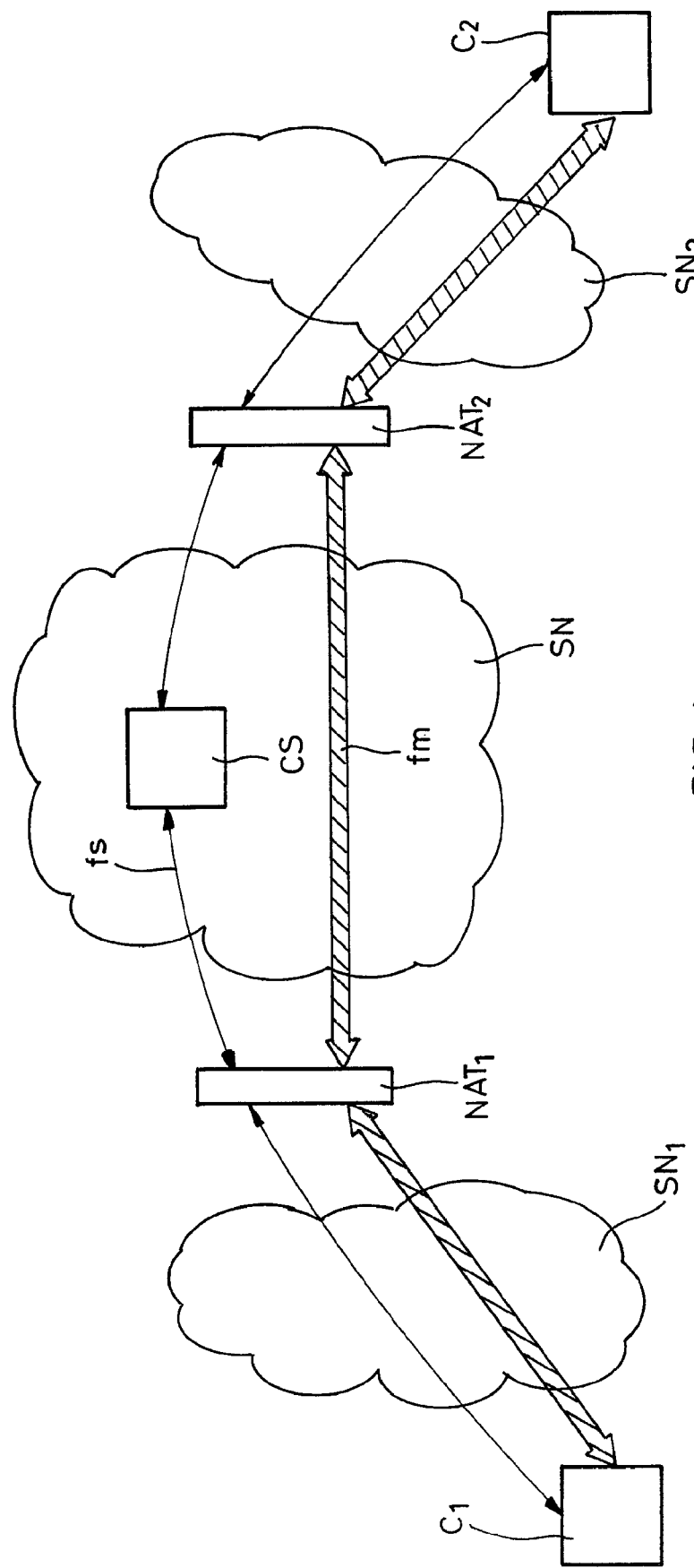
FIG_1

NETWORK ADDRESS TRANSLATION (NAT) TRAVERSAL EQUIPMENT FOR SIGNAL MESSAGES CONFORMING TO THE SIP PROTOCOL BY REDUNDANCY OF ADDRESS INFORMATION

BACKGROUND

This invention relates to communication networks. More precisely, it concerns the problem of transmission of signal messages through address translation equipment such as ((NATs)).

Existing communication networks can be used to set up a communication session through signal protocols such as H.323, MGCP (Media Gateway Control Protocol) or SIP (Session Initiation Protocol) and SDP (Session Description Protocol).

This SIP protocol is defined by the IETF (Internet Engineering Task Force) RFC 3261 and it has two purposes, namely:

to bring two parties into contact,
to negotiate characteristics of the session to be set up (video flow, CODEC encoder to be used, etc.), through the SDP protocol.

A calling party who would like to call another party can send an (((Invite))) signal message to a signal element called a ((Proxy)), containing its personal address, the physical address of its terminal (or more generally a client) and the personal address of the called party. The signal element has (((registrar))) means to make the personal address of the called party correspond to the physical address of the corresponding terminal. Due to this correspondence, the signal message may be routed to the calling party.

If the calling party accepts the call, the calling party replies with new signal messages comprising the physical address of the terminal or client. Thus, when each of the two terminals knows the physical address of the other party, they can set up on IP (Internet Protocol) connection for transmission of data (voice, video, etc).

However, a problem sometimes arises with network address translation (NAT) or Network Address-Port Translation (RAPT) equipment as defined in RFC 1631. ((The IP Network Address Translator)), and in RFC 3022 Traditional IP Network Address Translator (Traditional NAT))). This equipment is designed to interface a sub-network (typically a private network) with the Internet public network. The validity of the physical IP addresses of the equipment (terminals) in this sub-network is *limited to the sub-network. When this equipment wants to set up communications with equipment outside the sub-network, the address translation equipment assigns a temporary public address to it that is valid for the public network and memorizes the association between the client's private address and its temporary public address.

Therefore, the network address translation (PAT) equipment modifies messages transmitted between the private network and the public network during this transmission, by transforming terminal private addresses into public addresses in IP headers of outgoing messages, in other words from the private network to the public network, and transforming public addresses of terminals into private addresses in the IP headers of incoming messages, in other words messages from the public network to the private network.

Therefore, a problem arises for the address translation traversal equipment by SIP/SDP (or H.323 or other) signal messages. This problem is known under the term ((NAT traversal)).

For example, it is described in the IETF RFC 3235, entitled ((Network Address: Translation (NAT)—Friendly Application Design Guidelines)).

Signal protocols such as SIP and SDP are considered—as application protocols. For example, the SIP/SDP protocol may be transmitted by the TCP or UDP protocol, themselves located higher than 1P in the protocol stack. Therefore, a SIP message is actually a sequence of parameters encapsulated in a TCP or UDP message, itself encapsulated in an IP message.

Network address translation (NAT) equipment only modifies parameters at the level of the IP layer, and leave parameters located in higher layers intact. In other words, physical addresses contained in SIP and SDP messages are not modified by address translation equipment, unlike addresses contained in the IP headers.

The result is that the addressee (called client) of the signal message will only know the private address of the calling client. But the private address is meaningful only in a private network, and therefore, a communication session cannot be set up.

Since this problem is well known, a large number of solutions have been proposed to solve it. Two main approaches can be' distinguished to solve this problem: approaches based on the calling client and approaches based on a server or communication network equipment.

The first category includes the STUN (((Simple Traversal of UDP through NATs))) mechanism described in RFC 3489. This mechanism enables a client (or terminal) to know its public address. Thus, prior to emission of a message to the public network, the calling client transmits a request to a STUN server located* in this public network. This STUN server will reply with a message containing the address (and the port) at which it sees D the client, in other words its public address.

The client can then use this public address to indicate the address at which it wants to receive the responses, through the SDP protocol.

However, this solution suffers from a major limitation because many NATs are said to be ((symmetrical)) and associate a public address with a pair of parties. The public address that the NAT assigns to the client may thus be different for communication with the STUN server and for the session to be set up with the other party. In this case, it is impossible to set up a communication between the client and the other party.

Other proposals to 'improve the situation have been made based on the same principle, such as TURN (((Traversal Using Relay NAT))) mechanisms. The TURN mechanism is described in the ((draft-roseenberg-midcom-turn-09.txt)) document published on the IETF site in March 2006.

However, neither the STUN mechanism nor the TURN mechanism is adapted to the SIP protocol.

A new mechanism, ICE (<<Interactive Connectivity Establishment>>) has thus been proposed to adapt the transit of SIP signal messages. It is based on STUN and TURN mechanisms, while adapting them. The ICE mechanism is described in the ((draft-ietf-30 mmusic-ice-09.txt)) document, also published on the IETF site in June 2006 and entitled cc Interactive Connectivity Establishment. A Methodology for Network Address Translator (NAT) Traversal for Multimedia Session Establishment Protocols)).

The second category of solutions is based on equipment within the communication network. Note that the first solutions used a server within the network (for-example a STUN server), but the initiative was with the client. On the contrary, in this second family of solutions, the network equipment takes the initiative and implements NAT traversal solutions.

A first solution belonging to this family may for example be to associate an. application gateway with the network translation equipment NAT. This mechanism is known under the name ALG for ((Application Layer Gateway)) or ((Application-level Gateway)) and is defined in section 2.9 in RFC 2663 entitled ((IP Network Address Translator (NAT) Terminology and Considerations)) published in August 1999.

This gateway (or a NAT with the functions of such a gateway) has means of understanding application protocols used by messages. In particular, it can understand the content of signal messages and translate physical addresses contained in SDP messages so that the parties exchange their public addresses and not their private addresses, and can thus set up communication sessions.

One variant of this solution consists of using a so-called SBC (<<Session Border Controller))) that will be located on signal message paths. This type of product is capable of controlling the transmission of communication sessions and signal messages between the two networks. More precisely, the SBC can act as a SIP signaling "proxy", that provides means of controlling media transmission means (a ((media proxy))) through a protocol such as Megaco so that communication sessions can be suitably set up between the parties.

Other solutions are still available in each of these two major categories, although none has definitively taken the lead over the others.

Thus, a particular communication network can implement several solutions simultaneously. A communication client does not know a priori if the network with which he is. associated uses a traversal solution: it can then implement an ICE type solution while the network uses an ALG or SBC type solution.

The fact that two solutions are deployed is redundant and causes loss of resources, but solutions can also mutually disturb each other and cause incorrect operation of the communication network; the ALG or SBC equipment may modify addresses contained in SIP/SDP signal messages incorrectly or when they should not have been modified. Finally, communication sessions cannot be set up.

Apparently this problem has not yet been raised.

One solution that could be proposed would be to deactivate mechanisms used by a SIP client (ICE, STUN, TURN . . . ) manually when this client knows that it is ((attached)) to an SBC or an ALG gateway.

However, such a method would be complex to implement; a client cannot know that it is attached to an ALG gateway or to an SBC unless it knows the topology of its access supplier's network. Furthermore, the configuration must be modified manually every time that the client is attached to a new network.

Furthermore, this approach is not optimum because as soon as a solution based on an ALG gateway or an SBC is deployed, by construction it is preferred to the solution based on the client. But the client-based solution is usually optimum. because the client can use it to control setting up the communication session and this solution does not use a media relay like SBC or ALG solutions.

SUMMARY

The purpose of this invention is to overcome these disadvantages by enabling optimal cohabitation of client-based solutions and solutions based on the communication network (ALG, SBC, etc.).

The first purpose of the invention to achieve this is a method of setting up a communication session between a calling communication, client and a called communication client, through a communication network comprising at least one address translation equipment (NAT, NAPT, SBC, etc.).

The method comprises steps for transmission of signal messages transiting through this address translation equipment in a manner known in itself, enabling interchanges of physical addresses of communication clients to set up the— communication session.

The method according to the invention is innovative and is characterized in that at least one client transmits at least one signal message containing:
  a physical address in a first location and,
  coded "information containing this particular physical
    address in a distinct second location.

To the extent that it is coded, the information containing the physical address cannot be modified by the address translation device (NAT, NAPT, SBC, etc.). The communication client to which the signal message is addressed then has the unmodified physical address of the emitting client. He can use this address in preference, being assured that it has not been modified.

Furthermore, the fact that the encoded address is added redundantly without deleting the non-encoded address makes it possible to remain compatible with the existing IETF specifications and the different address translation equipment.

This physical address may be obtained by a network address translation traversal solution implemented by the communication client as described above. For example, this solution may be the STUN mechanism.

Therefore, the invention solves a technical problem that faces architectures deploying address translation traversal equipment mechanisms, such as the ICE or STUN.

According to one variant of the "invention, the signal message(s) also contains
  numbers of ports in first port locations, and,
  one or more items of coded information containing said
    port number(s), in distinct second port locations.

Depending on the implementation of the invention, the different locations are SDP protocol fields defined by the IETF RFC 2327. Second locations (for addresses and possibly for port numbers). are attribute fields of this SDP protocol, in other words ((a)) fields as defined in RFC 2327 paragraph 6.

Another purpose of the invention is a communication client with means of sending signal messages to set up a communication session with at least one other communication client, and address translation traversal equipment.

This client is characterized in that it has means of adding coded information containing the physical address obtained by these address translation traversal means, into the signal message before the signal message is sent.

These means may also be capable of adding coded information containing a port number.

This coded information may be added into the fields of a part conforming to the SDP protocol of the signal message conforming to the SIP protocol, particularly in the ((a)) attribute field.

Another purpose of the invention is a communication network implementing communication clients as described above, and a software product using the method described above.

The invention will become clearer after reading the following description of an embodiment with reference to the appended figures.

BRIEF DESCRIPTION OF THE DRAWING

FIG. 1 shows the communication network in which the invention could be used.

DETAILED DESCRIPTION OF EXAMPLE EMBODIMENTS

In this example in FIG. 1, the communication network consists of three networks $SN_1$, $SN_2$ and SN, connected by two items of address translation equipment $NAT_1$ and $NAT_2$. This is a classical. case in which each communication client $C_1$ and $C_2$ is connected to a private sub-network, $SN_1$ and $SN_2$ respectively. Each of these private sub-networks I connected to a public network SN through address translation equipment $NAT_1$ and $NAT_2$ respectively.

However, other cases are possible. For example, a single address translation equipment NAT may be deployed between two private sub-networks belonging to two parts of a company. It would also be possible to imagine the situation in which one of the two clients is connected to a private sub-network without the use of a NAT. In this case, a single address translation equipment NAT is deployed between the other private sub-network and the public sub-network.

The communication network (mainly the public network SN) comprises at least one item of equipment. This equipment may be IP transmission nodes such as routers, but also servers, signal elements, SIP proxy, call servers, etc. Due to reasons of clarity, only the address translation equipment $NAT_1$ and $NAT_2$, and the call server CS are shown in FIG. 1.

In the following, this call server CS is considered in its most general acceptance and therefore. covers ((SIP proxy)) signal elements, ((softswitches)), call controllers, CSCFs ((( Call Session Control Function))) in an IMS (((IP Multimedia Subsystem))) architecture, etc.

Setting up a communication session forms part of the state of the art well known to an expert in the field. Schematically, it consists of steps—to transmit a signal message between two communication clients $C_1$ and $C_2$. This signal flow fs is transmitted by the call server CS located in the public network SN. As mentioned above, these signal message transmissions enable exchange of physical addresses between communication clients $C_1$ and $C_2$, and thus help to set up the communication session fm between two communication clients: the media flow (voice, data, video, etc.) fm may then be transmitted between the two clients using these two exchanged physical addresses.

The signal messages pass through address translation equipment $NAT_1$ and $NAT_2$. Thus, each of the two communication clients $C_1$ and $C_2$ has a public physical address (during a session), assigned by the address translation equipment to which it is attached, and different from its private physical address.

In order to be able to set up the communication session fm, the two clients must exchange their public physical addresses (and not their private physical addresses).

In the example shown in FIG. 1, it is assumed that the calling communication client $C_1$ implements address translation traversal (((NAT Traversal))) equipment. It is understood by the expression ((Implement)) that the client has transversal address translation. equipment means, but also that these means are activated. It would be possible to imagine the situation in which these means are deactivated for different reasons (failure, manual deconfiguration because the user considers them not sufficiently high performance, etc.)

These traversal means may be conforming to the different possible solutions in the existing and future state of the art that are based on communication clients. Thus, there are the STUN, TURN or ICE mechanisms as mentioned above.

Before sending a signal message, the calling communication client $C_1$ adds the following to this message:
  its physical address, and particularly its public physical address that it may have obtained by a address translation traversal equipment solution, and
  a coded information containing this physical address.

Therefore, one characteristic of the invention lies in adding coded and redundant information corresponding to the physical address into—a signal message addressed to the destination party.

For an embodiment using the SIP protocol, this signal message is typically an ((INVITE)) message. This ((INVITE)) signal message comprises a part conforming to the SDP protocol used to describe the communication session to be implemented. Therefore, the SDP protocol is described in the IETF RFC 2328 entitled ((SDP: Session Description Protocol)).

The communication client $C_1$ adds its public physical *address and possibly port numbers, into this SDP part (or into one of the SEA parts in the case of a signal message containing several SDP parts), in the locations specified for this purpose by the protocol.

The SDP protocol includes a number of fields, each possibly containing sub-fields. These fields can be broken down into two categories:

Fields intended to describe the session to be set up, namely:
  v Protocol version
  0 Owner/creator and identifier of the session
  s session name
  i information about the session
  u URI of the description
  e electronic (e-mail) address
  p telephone number
  c connection information
  b passband information
  t session validity duration
  r repetition interval
  z adjustment of time slots
  k encryption key
  a attributes A second category of fields consists of fields related to description of the medium (media), namely:
  m medium name and transport address
  i medium title
  C connection information
  b passband information
  k encryption key attributes According to the specification for the SD_P protocol, these fields are put into order, to enable fast and efficient reading by communication client protocol interfaces.

Some fields contain locations in which the communication client may or must add a physical address. Other locations are designed to contain a number of ports.

Thus, the ((o)) field contains the following sub-fields: <user name> <session_id> <version> <network type> <address type> <address>, and as specified by the RFC 2327.

The <address> sub-field contains the physical address of the communication client $C_1$ If the client has several physical addresses, then this address is the physical address at which he would like to set up the communication session. It will preferably be its public physical address, in other words known and usable within the communication network SN.

The ((m)) field may contain the <media> <port> <transport> <fmt list> sub-fields. Therefore, the second sub-field may contain a port number.

The ((c)) field may contain the <network type> <address type> <connection address> sub-fields.

The ((a)) attributes field is an open field containing the two <attribute> and <value> subfields. It may also contain physical addresses.

According to the invention, the communication client adds coded information containing the physical address in a second location distinct from the first. In other words, a physical address may be contained both in a first location (in a non-coded form) and in a second location (in coded form).

This second location may be an ((a)) attributes field. It may contain an arbitrarily chosen attribute name, but known to all communication clients that might be parties in a communication session. In the following example, this attribute name is ((rdd)).

Considering the problem that arises due to the imposed order of SDP protocol fields, the—second location may be added in the next possible position. If the physical address or port number is contained in a first location that is an ((o)), ((c)) or ((m)) field, the second location is the first ((a)) field that follows. If the first location is the ((a)) field, then the second location is the immediately following ((a)) field.

These rules facilitate the design of the protocol interface of communication client $C_2$ that is the destination of the signal message.

This redundant addition of the physical address and the port number may be made for all physical addresses and port numbers contained in the signal message, or for only a part of them.

According to one embodiment of the invention, the addresses and port numbers are coded in isolation. When a field (in other words a ((line))) contains a physical address, only the physical address is coded and added into the second location corresponding to this field.

According to another embodiment, the entire field is coded and added into the second location. In this way, if a particular field contains both a port number and a physical address, a single coding is necessary and all information may easily be-added into a single second location (in other words a single ((a)) field).

In other words, the coded information may contain only one physical address (coded) or a port number (coded), or it may also contain other information (and in particular contain both a port number and a physical address).

An example of an SDP part of an SIP signal message according to this second embodiment of the invention is given below:

V=O
o=mhandley 2890844526 2890842807 IN IP4 126.16.64.4
i=A Seminar on the session description protocol
c=IN IP4 224.2.17.12/127
a=rdd:bzlto.GFuZGxleSAyODkwODQONT12ID140TA4ND14MDcgS
U4gSVA0I DEyNi4xNi42NC40
a=rdd:Yz1 JTiBJUDQgMjI0LjluMTcuMTIvMT13
m=audio 49170 RTP/AVP 0
a=rdd:bT1 hdWRpbyA0OTE3MCBSVFAVQVZQIDA=
a=rtcp:53020
a=rdd:YT1ydGNwOjUzMD1w
a=rtpmap:96 L8/8000
a=rtpmap:97 L16/8000
m=application 32416 udp wb
a=rdd:bT1-hc.HBsaWNhdGlvbiAzMjQxNiB1ZHAgd21=

According to the rules given above, the first ((a)) field is the second location for the address contained in the ((o)) field. The second a D field is the—second location for the physical address contained in the ((c)) field. The third ((a)) field is the second location for the port number contained in the first ((m)) field (49170). The fifth ((a)) field is the second location for the port number (53020) contained in the fourth ((a)) field. Finally, the lost ((a)) field is the second location for the port number (32416) contained in the ((m)) field that immediately precedes it.

However, in all of these fields, the entire line. containing the physical address or the port number is coded. In other words, the field containing a physical address and/or a port number is coded, rather than the physical address or the port number taken *individually.

Thus, the coded information
((rdd:bzl taGFuZGxleSAyODkwODQ0NT12ID!40TA4 ND14MDcgSU4gSVA0I DEyNi4xNi42NC40))
contains the physical address ((126.16.64.4)) but also the other data present in the field cc o=mhandley 2890844526 1190842807 IN IP4 126.16.64.4))

In this example, the physical addresses and the port numbers are encoded using base 64. This type of coding is described for example by the IETF (Internet Engineering Task Force) RFC 3548, but there are different variants.

However, all encoding types are possible. However, it is* necessary that the different parties share knowledge. of the encoding type (and possibly the key) used and that network devices INAPT, NAT, SBC, etc.) cannot recognize that coded information items are physical port numbers and/or addresses.

In some cases, it may be useful to implement more advanced cryptography techniques.

It may also be possible to transport information about the coding type within the signal message, and possibly keys or other information of the same nature for decoding by the destination communication client $C_2$.

In the embodiment in which only the physical addresses and port numbers are encoded, they may be modified simply to deceive devices in the communication network.

For a physical IP address, it may be sufficient to simply transform dots into oblique bars. Thus, address ((126.1 6.64.4>> would become ((126/16/64/4)). Another possibility would be to transform each digit in the physical address by a letter with the corresponding rank. The address in the example would become ((abf.af.fd.d)).

Once emitted, the signal message is transmitted to the network address translation equipment $NAT_1$, then to other equipment on the public network SN. Possibly, it may also have transited through equipment in the private sub-network $SN_1$ before reaching the network address translation equipment $NAT_1$.

Some of this equipment may be provided with address translation traversal means. These means may be conforming to the solutions described above: it could be an ALG (Application Layer Gateway) or an SBC (Session Border Controller) server.

This equipment can then modify the physical addresses and the port numbers contained in the SDP part of the SIP signal messages. Thus, the addresses contained in the ((m)), ((c)), ((o)) fields may be modified before arriving at the communication client $C_2$. Some ((a)) fields may also be modified when they contain port numbers or non-encoded physical ad-dresses, as is the case for the fourth ((a)) field in the example.

However, since they are encoded, the port numbers and physical addresses contained in the ((a)) fields cannot be modified by these devices. They reach the communication client $C_2$ without modification, and the communication client can use them in preference to the physical addresses and port numbers contained in the other fields that could have been modified.

Similarly, other signal messages may also comprise encoded physical addresses and port numbers, either in the case of messages sent by the communication client $C_1$ or messages sent by the communication client $C_2$. All signal flows fs can thus be conforming to what has been described above.

Thus, using physical addresses and port numbers and assuring that they have not been modified, makes it possible for the two communication clients to set up the communication session and one (or more) media flows fm.

The invention claimed is:

1. A method of setting up a communication session between communication clients, via a network including at least one address translation equipment, the method comprising:
    coding, by one of the communication clients on a client side of the network, a public physical address of the one of the communication clients;
    sending, by the one of the communication clients on the client side of the network, a signal message via the at least one address translation equipment, the one of the communication clients having the public physical address and a private physical address, the signal message containing the public physical address of the one of the communication clients in a first location, and the signal message including the coded public physical address of the one of the communication clients in a distinct second location before the sending signal message by the one of the communication clients on the client side of the network, the coded public physical address being received by another one of the communication clients without modification;
    and setting up a communication session between said sending one of the communication clients and said another one of the communication clients, via the network, based on the coded public physical address.

2. The method according to claim 1, wherein said public physical address is obtained by a network address translation traversal solution implemented by said one of the communication clients that sent the signal message.

3. The method according to claim 1, wherein said signal message also includes one or several port numbers in first port location(s), and one or more items of coded information containing said port number(s) in distinct second port location(s).

4. The method according to claim 1, wherein the first location and the distinct second location are fields conforming with a session description protocol (SDP) of said signal message, the signal message conforming to a session initiation protocol (SIP).

5. The method according to claim 1, wherein said distinct second location is an attribute field of a session description protocol (SDP).

6. A communication client comprising:
    a public physical address and a private physical address;
    a sender on a client side of a network configured to send, via at least one address translation equipment, a signal message to set up a communication session with at least one other communication client, the signal message containing the public physical address of the communication client in a first location;
    and a coder on the client side of the network configured to code the public physical address of the communication client obtained by address translation traversal and add the coded public physical address in a distinct second location of the signal message before the signal message is sent by the sender on the client side of the network, the coded public physical address being received by the at least one other communication client without modification, wherein setting up the communication session between the communication client and the at least one other communication client is based on the coded public physical address.

7. The communication client according to claim 6, further configured to add coded information containing a port number.

8. The communication client according to claim 7, wherein said coded public physical address and coded information containing the port number is added into fields conforming with a session description protocol (SDP) of the signal message and the signal message conforming with a session initiation protocol (SIP).

9. A communication network comprising communication clients according to claim 6.

10. The communication network according to claim 9, wherein the communication network conforms to Internet Protocol (IP) Multimedia Subsystem (IMS) specifications.

11. A non-transitory computer readable medium storing computer readable code for instructing an apparatus to perform the method according to claim 1.

* * * * *